United States Patent
Koskela et al.

(10) Patent No.: US 12,022,530 B2
(45) Date of Patent: Jun. 25, 2024

(54) RESOURCE SELECTION FOR RANDOM ACCESS

(71) Applicant: NOKIA TECHNOLOGIES OY, Espoo (FI)

(72) Inventors: Timo Koskela, Oulu (FI); Samuli Heikki Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 379 days.

(21) Appl. No.: 17/428,871

(22) PCT Filed: Feb. 14, 2019

(86) PCT No.: PCT/EP2019/053677
§ 371 (c)(1),
(2) Date: Aug. 5, 2021

(87) PCT Pub. No.: WO2020/164711
PCT Pub. Date: Aug. 20, 2020

(65) Prior Publication Data
US 2022/0110166 A1    Apr. 7, 2022

(51) Int. Cl.
*H04W 74/08* (2009.01)
*H04B 7/06* (2006.01)
(Continued)

(52) U.S. Cl.
CPC ...... *H04W 74/0841* (2013.01); *H04B 7/0695* (2013.01); *H04L 5/0051* (2013.01);
(Continued)

(58) Field of Classification Search
CPC .... H04B 7/0695; H04L 5/0051; H04W 24/08; H04W 74/006; H04W 74/0833; H04W 74/0841; H04W 76/01
See application file for complete search history.

(56) References Cited

U.S. PATENT DOCUMENTS

2021/0112591 A1* 4/2021 Lee .................. H04W 16/28
2021/0282181 A1* 9/2021 Yi .................... H04W 76/27

FOREIGN PATENT DOCUMENTS

EP    3 528 399 A1    8/2019

OTHER PUBLICATIONS

International Search Report and Written Opinion dated Oct. 22, 2019 corresponding to International Patent Application No. PCT/EP2019/053677.

(Continued)

*Primary Examiner* — Mansour Oveissi
*Assistant Examiner* — David M Oveissi
(74) *Attorney, Agent, or Firm* — Lippes Mathias LLP

(57) ABSTRACT

It is provided a method, comprising checking if a contention based random access is to be performed for a reason different from a beam failure recovery; monitoring if a received first reference signal has a received power above a set power threshold and/or a received quality above a set quality threshold; checking if a reception device is configured to receive a downlink control signal on a first beam corresponding to the first reference signal; instructing a transmission device to transmit a preamble of the contention based random access on the first beam if the contention based random access is to be performed for the reason, the received first reference signal has the received power above the set power threshold and/or the received quality above the set quality threshold, and the reception device is configured to receive the downlink control signal on the first beam.

12 Claims, 2 Drawing Sheets

(51) Int. Cl.
  *H04L 5/00* (2006.01)
  *H04W 24/08* (2009.01)
  *H04W 74/00* (2009.01)
  *H04W 74/0833* (2024.01)
  *H04W 76/19* (2018.01)

(52) U.S. Cl.
  CPC ......... *H04W 24/08* (2013.01); *H04W 74/006* (2013.01); *H04W 76/19* (2018.02)

(56) References Cited

OTHER PUBLICATIONS

3GPP TS 38.321 V15.4.0 (Dec. 2018), Technical Specification, 3rd Generation Partnership Project; Technical Specification Group Radio Access Network; NR; Medium Access Control (MAC) protocol specification (Release 15), Jan. 11, 2019, pp. 1-77, XP051591686.
Intel Corporation, "Remaining Issues on Beam Management," 3GPP Draft; R1-1810751 3GPP TSG RAN WG1 Meeting #94b, Chengdu, China, Sep. 29, 2018, XP051518155.
MediaTek Inc., "Summary #1 on Remaing issues on Beam Failure Recovery," 3GPP Draft; R1-1809805, 3GPP TSG RAN WG1 Meeting #94, Gothenburg, Sweden, Aug. 23, 2018, XP051517164.
3GPP TS 38.213 V15.4.0 (Dec. 2018), Technical Specification, 3rd Generation Partnership Project; Technical Specification Group Radio Access Network; NR; Physical layer procedures for control (Release 15), Dec. 2018.
3GPP TS 38.214 V15.4.0 (Dec. 2018), Technical Specification, 3rd Generation Partnership Project; Technical Specificaiton Group Radio Access Network; NR; Physical layer procedures for data (Release 15), Dec. 2018.

\* cited by examiner

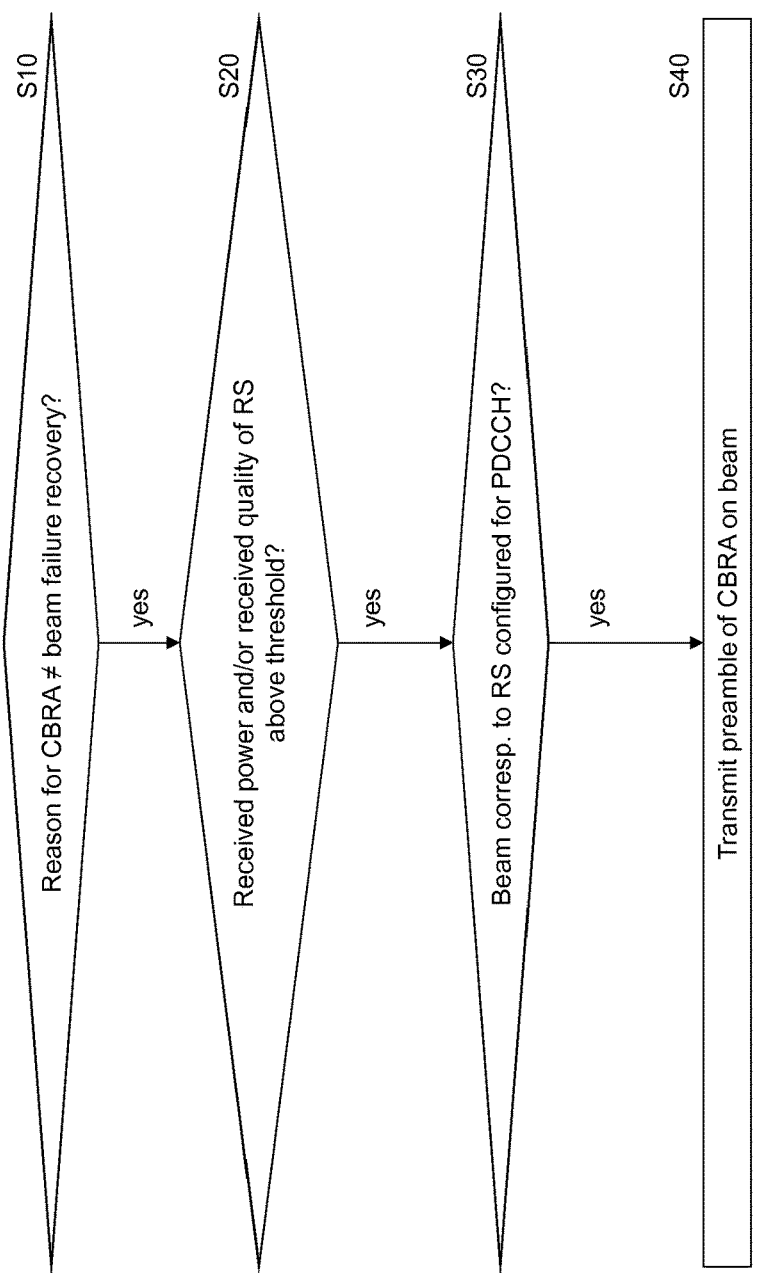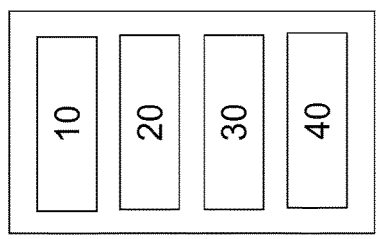

RESOURCE SELECTION FOR RANDOM ACCESS

FIELD OF THE INVENTION

The present invention relates to resource selection for CBRA.

Abbreviations

3GPP 3$^{rd}$ Generation Partnership Project
4G/5G 4$^{th}$/5$^{th}$ Generation
BFD Beam Failure Detection
BFD-RS Beam Failure Detection-Reference Signal
BFI Beam Failure Instance
BLER Block Error Rate
CBRA Contention Based Random Access
CCCH Common Control Channel
CE Control Element
CFRA Contention-Free Random Access
CORESET Control Resource Set
CSI-RS Channel State Information RS
CSI-RSRP Channel State Information RSRP
DMRS Demodulation Reference Signal
gNB next generation NodeB
L1/L2/L3 Layer 1 (=PHY)/Layer 2 (=MAC)/Layer 3 (=Transport)
LTE Long Term Evolution
MAC Medium Access Control
Msg Message
NB NodeB
NR New Radio
NW Network
OOS Out-of-Sync
PDCCH Physical Downlink Control Channel
PHY Physical Layer
PRACH Physical Random Access Channel
QCL Quasi Co-Location
RA Random Access
RACH Random Access Channel
RAN Radio Access Network
RAR Random Access Response
Rel Release
RRC Radio Resource Control
RS Reference Signal
RSRP Reference Signal Received Power
RX Receive/Reception
SDU Service Data Unit
SR Scheduling Request
SSB Synchronization Signal Block
SS/PBCH Synchronization Signal/Physical Broadcast Channel
SS-RSRP Synchronization Signal-Reference Signal Received Power
TAT Time Alignment Timer
TCI Transmission Configuration Indication
TS Technical Specification
UE User Equipment
UL Uplink
URL Uniform Resource Locator

BACKGROUND OF THE INVENTION

Beam Failure Detection Reference Signal (BDF-RS) List

Network configures UE with a set of reference signals for monitoring the quality of the link. This set may be referred to as q0 or Beam Failure Detection Reference Signal (BFD-RS). Typically, BFD-RS(s) are configured to be spatially Quasi Co-Located (QCL'd) with PDCCH Demodulation Reference Signal (DMRS). I.e. the BFD-RSs correspond to downlink beams used to transmit PDCCH. Downlink Beams are identified by reference signal, either SS/PBCH block (time location) index or CSI-RS resource index. Network may configure the BFD-RS list using RRC signalling, or it may configure the list with combined RRC+MAC Control Element (CE) signaling.

When UE is not explicitly configured with BFD-RS list, it determines the BFD-RS resources implicitly based on the configured/indicated/activated PDCCH-TCI states per CORESET. I.e., the UE determines the downlink reference signals (CSI-RS, SS/PBCH block) that are QCL'd (e.g. spatially) with PDCCH DMRS, or in other words, PDCCH beams. "Active TCI state" means a beam that is configured for the communication with the network. As an example, network configures UE (using RRC signalling) with a list of TCI states (downlink reference signals such as SSB, CSI-RS, CSI-RS for tracking, CSI-RS for CSI-RS acquisition etc.). Network may also configure UE with a set of TCI states for PDCCH reception and one of the TCI states per CORESET is activated for PDCCH reception. This activation indicates UE the downlink reference signal that has QCL association with PDCCH DMRS or in other words is the "PDCCH beam" for UE. Currently only one TCI State for PDCCH can be activated per CORESET and UE may have up to 3 CORESETs configured in release 15.

Declaring Beam Failure

UE's physical layer assesses the quality of the radio link (based on BFD-RS in set of q0) periodically. Assessment is done per BFD-RS and when the radio link condition of each BFD-RS in the beam failure detection set is considered to be in failure condition (e.g. the hypothetical PDCCH BLER estimated using the RS is above a configured or predefined threshold), a beam failure instance (BFI) indication is provided to higher layer (MAC). One example of BLER threshold value may be the out of sync quality threshold (Qout, a SINR threshold) used for radio link monitoring OOS/Qout=10%. Evaluation and indication is done periodically. In case at least one of the BFD-RSs is not in failure condition, no BFI indication is provided to higher layer.

MAC layer implements a counter to count the BFI indications from the PHY layer and if the BFI counter reaches a maximum value (configured by the network or predefined) a beam failure is declared. This counter may be supervised by a timer: each time MAC receives BFI indication from lower layer the timer is started. Once the timer expires, the BFI counter is reset (counter value is set to zero).

Candidate RS (Beam) List

Network may provide UE with a list of candidate RSs (candidate beams) for failure recovery purposes. The candidates in the provided list may be indicated using a dedicated signal. UE's PHY layer may provide candidate beam L1-RSRP measurements to MAC layer which performs the selection of a new candidate and determines the uplink resources to indicate the new candidate to network. Network may configure UE with dedicated signalling resources (PRACH resources) that are candidate beam specific i.e. UE can indicate that a specific candidate is suitable for recovery (i.e. the quality is above threshold) by sending a preamble on the specific PRACH resource (for CFRA access). For CBRA based recovery, UE selects an SSB with SS-RSRP above specific threshold (rsrp-ThresholdSSB).

Beam Failure Recovery Request

Beam failure recovery procedure is initiated if UE has declared beam failure and UE has detected new candidate beam or beams based on L1 measurements (e.g. L1-RSRP). A dedicated signal (CFRA, contention free preamble) corresponding to a specific RS (SSB or CSI-RS) may be configured for each candidate RS in the Candidate-Beam-RS-List (referred as set of q1). Dedicated signal may be used to indicate new candidate beam to gNB. A specific threshold may be configured or predefined so that if any of the candidates in set q1 (based on L1-RSRP measurements) are above the threshold, this candidate can be indicated using a dedicated signal (set of resources in set q1). UE selects the candidate beam from that set and in case there are no q1 candidate beams above the threshold, UE utilizes contention based RACH procedure to indicate a new candidate to network. Contention Based Random Access (CBRA) preamble resources are mapped to specific downlink RS (such as SSB). The CBRA recovery request (to be performed under the condition that CFRA recovery cannot be used) is described in MAC specification 3GPP TS 38.321 (clause 5.1.2) as follows:

5.1.2 Random Access Resource Selection

1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidate-BeamRSList or the CSI-RSs with CSI-RSRP above rsrp-ThresholdCSI-RS amongst the CSI-RSs in candidateBeamRSList is available:
  2> select an SSB with SS-RSRP above rsrp-ThresholdSSB amongst the SSBs in candidateBeamRSList or a CSIRS with CSI-RSRP above rsrp-ThresholdCSI-RS amongst the CSI-RSs in candidateBeamRSList;
1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.

QCL, Quasi Co-Location Assumption (3GPP TS 38.213 and 3GPP TS 38.214)

When two different signals share the same QCL type, they share the same indicated properties. As an example, the QCL properties may be e.g. delay spread, average delay, doppler spread, doppler shift, or spatial RX. QCL type A means Doppler spread, Doppler shift, delay spread, and/or average delay, and QCL type D means spatial RX. Currently 3GPP TS 38.214 lists the following QCL types:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

As a further example if a CSI-RS and SSB are of the same QCL-Type D, it means that UE may utilize same RX spatial filter (beam) to receive these signals.

In [3], a following case was considered: in case of partial beam failure UE prioritizes the random access to non-failed PDCCH beam. In prior art, specific conditions or selection logic other than partial beam failure was not explicitly discussed.

From [3]:
When the UL access is due to arrival of uplink data and UE has detected a partial beam failure and TAT has expired (i.e., at least the beam used for the communication but not all the beams configured for the communication fail), UE uses the contention based RA procedure. It selects the preamble (CBRA resource) such that the selected preamble is associated with a beam that is an active TCI state (an SSB or CSI-RS reference signal corresponding the transmission beam for PDCCH reception)) which is not in failure condition. "Active TCI state" means a beam that is configured for the communication with the network.

References

[1] 3GPP TS 38.213 Physical Layer Procedures—Chapter 6 Link Recovery Procedures
[2] 3GPP TS 38.321—Chapters 5.2 and 5.17 Beam Failure Recovery Procedure
[3] EP 18157025.0 (filed on 15.2.2018)

SUMMARY OF THE INVENTION

It is an object of the present invention to improve the prior art.

According to a first aspect of the invention, there is provided an apparatus, comprising first means for checking configured to check if a contention based random access is to be performed for a reason different from a beam failure recovery; means for monitoring configured to monitor if a received first reference signal has a received power above a set power threshold and/or a received quality above a set quality threshold; second means for checking configured to check if a reception device is configured to receive a downlink control signal on a first beam corresponding to the first reference signal; means for instructing configured to instruct a transmission device to transmit a preamble of the contention based random access on the first beam if the contention based random access is to be performed for the reason, the received first reference signal has the received power above the set power threshold and/or the received quality above the set quality threshold, and the reception device is configured to receive the downlink control signal on the first beam.

According to a second aspect of the invention, there is provided an apparatus, comprising means for monitoring configured to monitor if a preamble of a contention based random access procedure is received from a terminal in a first beam, wherein the first beam is configured for transmission of a downlink control signal to the terminal; means for inhibiting configured to inhibit a beam reconfiguration for the terminal if the preamble is received in the first beam.

According to a third aspect of the invention, there is provided a method, comprising checking if a contention based random access is to be performed for a reason different from a beam failure recovery; monitoring if a received first reference signal has a received power above a set power threshold and/or a received quality above a set quality threshold; checking if a reception device is configured to receive a downlink control signal on a first beam corresponding to the first reference signal; instructing a transmission device to transmit a preamble of the contention based random access on the first beam if the contention based random access is to be performed for the reason, the received first reference signal has the received power above the set power threshold and/or the received quality above the set quality threshold, and the reception device is configured to receive the downlink control signal on the first beam.

According to a fourth aspect of the invention, there is provided a method, comprising monitoring if a preamble of a contention based random access procedure is received from a terminal in a first beam, wherein the first beam is configured for transmission of a downlink control signal to the terminal; inhibiting a beam reconfiguration for the terminal if the preamble is received in the first beam.

Each of the methods of the third and fourth aspects may be a method of resource selection.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some example embodiments of the invention, at least one of the following advantages may be achieved:
  The network is able to better determine whether the reason for CBRA is beam failure recovery or some other reason without additional signalling;
  Unnecessary reconfigurations are avoided;
  The solution is backward compatible between UE and NW.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein:

FIG. 1 shows an apparatus according to an example embodiment of the invention;

FIG. 2 shows a method according to an example embodiment of the invention;

DETAILED DESCRIPTION OF CERTAIN EXAMPLE EMBODIMENTS

Figure 4:
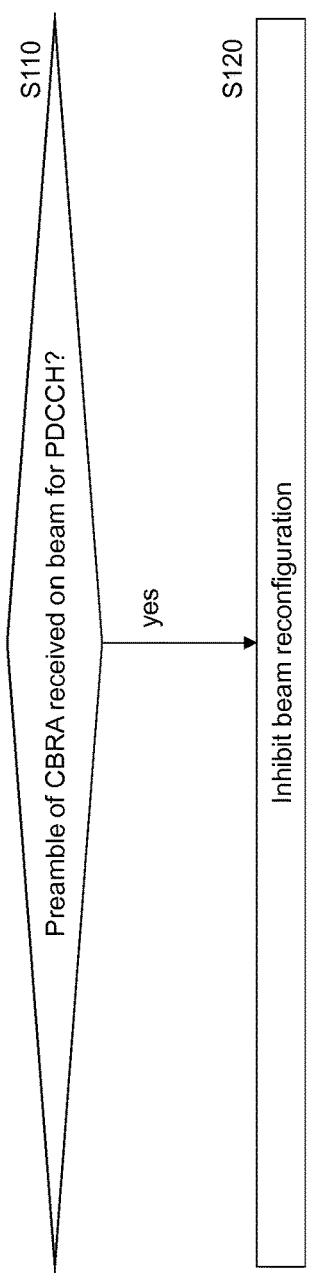
FIG. 4 shows a method according to an example embodiment of the invention.

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Contention based random access (CBRA) is currently used for beam failure recovery and the procedure is similar to CBRA when performed due to other reasons (i.e. after TAT expiry, UL data arrival, SR procedure failure, or when SR is not configured). When UE performs CBRA beam failure recovery (beam failure has been detected and new candidate beam found and selected), the reason is not indicated to network. As the reason is not indicated to network explicitly by UE, network needs to determine implicitly that the UE requests beam failure recovery. This may be problematic due to the current way the CBRA is performed.

Currently in CBRA procedure, the resource selection on which the preamble is sent is based solely on RSRP measurements on reference signals (such as SSB) without considering any specific selection rules although the requested action from the network might be different: In case of beam failure recovery UE needs configuration for new beams for PDCCH reception. In case the CBRA is initiated for other reasons, UE does not need any reconfiguration for new beams for PDCCH reception because the currently used beams are in non-failure condition. When the CBRA is initiated due to beam failure and network is not aware of it, network may assume that UE will continue using the current configuration for PDCCH reception after the CBRA procedure is completed. Thus, NW may not be able to reach the UE anymore after Msg4 is sent because of the beam failure condition. Alternatively, when UE has initiated CBRA for other reason than beam failure and network assumes that CBRA was for beam failure, it may assume that UE can only be reached using the indicated beam in the CBRA after msg4 and hence provides the new configuration for PDCCH reception although UE would be able to continue to monitor PDCCH with current configuration.

According to some example embodiments of the invention, when contention based random access (CBRA) is performed by UE for other reason than beam failure recovery, UE prioritizes in the random access resource selection the SS blocks (or in general random access resources) that indicate the beams configured for the UE for PDCCH reception, or have QCL association with the beam configured for the UE for PDCCH reception ("QCL assumption"). As an example, if UE is configured with TCI State for PDCCH that is CSI-RS (or tracking reference signal) and the CSI-RS signal does not have corresponding random access resource, it may prioritize the beam that is QCL'd with it and can be indicated using a random access signalling. In one example the QCL'd beam may be the SS Block beam.

In detail, in some example embodiments of the invention, in case of CBRA for other reasons than beam failure recovery, UE determines if the RSRP for any SSB (referred to as SS-RSRP) that correspond the beam or beams used for PDCCH reception is above the threshold rsrp-ThresholdSSB if at least one of such SSBs with SS-RSRP above rsrp-ThresholdSSB is available UE selects an SSB with SS-RSRP above rsrp-ThresholdSSB.

Alternatively, if at least one SS-RSRP is above detection threshold, UE selects SS-RSRP above the threshold (no SSB corresponding to the beam or beams used for PDCCH reception is 'available').

In this case the NW may assume the UE is doing beam failure recovery, however, in such situation changing the configuration for PDCCH reception may anyway be required.

The selection of SSBs may be determined through QCL association between the active TCI state for PDCCH (PDCCH beam that may be e.g. CSI-RS, CSI-RS for tracking or the like) and the QCL'd SSB. In another implementation example, instead of using RSRP and corresponding threshold or in addition thereto, a quality based metric such as SINR may be used.

E.g. if at least one of such SSBs with SS-SINR (SINR/L1-SINR calculated for SS/PBCH signal) above sinr-ThresholdSSB is available UE selects an SSB with SS-SINR above sinr-ThresholdSSB.

The threshold (named rsrp-ThresholdSSB in this example) may be configured by the network or predefined.

In one embodiment, the UE prioritizes the currently active TCI states configured for PDCCH reception over the de-active TCI states configured for PDCCH reception. The de-active TCI states are still prioritized over the SSBs which the UE does not have configuration for PDCCH reception or are not configured as TCI states (either directly or through QCL assumption with e.g. CSI-RS or CSI-RS for tracking or the like).

According to some example embodiments of the invention, when UE performs CBRA for beam failure recovery, it restricts the selection of SSB (or CSI-RS or SSB through QCL assumption with CSI-RS) to exclude PDCCH beams from the random access resources as long as at least one SSB with SS-RSRP not associated with beam for PDCCH reception (either directly or through QCL assumption) is above rsrp-ThresholdSSB.

It should be noted that although SSB is explicitly mentioned throughout the invention for resource selection the method may be used for other types of signals such as CSI-RS that can be indicated using random access preamble signal.

An implementation of an example embodiment of the invention for prioritizing the SSBs corresponding to beams configured for PDCCH reception in case CBRA was performed for other reasons than beam failure recovery is shown below. Amendments to the current MAC specification 3GPP TS 38.321 are shown in bold:

In another implementation example, instead of or in addition to using SS-RSRP and corresponding RSRP threshold (rsrp-ThresholdSSB) for selecting random access resources, a SINR based metric may be used e.g. SS-SINR and sinr-ThresholdSSB.

5.1.2 Random Access Resource Selection

The MAC entity shall:
( . . . ) contention free part omitted.
1> else (i.e. for the contention-based Random Access preamble selection):
  2> if the Random Access procedure was not initiated for beam failure recovery (as specified in subclause 5.17); and
  2> if at least one of the SSBs corresponding to beam(s) configured for PDCCH reception (as specified in TS 38.331) with SS-RSRP above rsrp-ThresholdSSB is available:
    3> select an SSB with SS-RSRP above rsrp-ThresholdSSB amongst the SSBs corresponding to beam(s) configured for PDCCH reception.
  2> else if at least one of the SSBs with SS-RSRP above rsrp-ThresholdSSB is available:
    3> select an SSB with SS-RSRP above rsrp-ThresholdSSB.
  2> else:
    3> select any SSB.
  2> if Msg3 has not yet been transmitted:
    3> if Random Access Preambles group B is configured:
      4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
      4> if the Random Access procedure was initiated for the CCCH logical channel and the CCCH SDU size plus MAC subheader is greater than ra-Msg3SizeGroupA:
        5> select the Random Access Preambles group B.
      4> else:
        5> select the Random Access Preambles group A.
    3> else:
      4> select the Random Access Preambles group A.
  2> else (i.e. Msg3 is being retransmitted):
    3> select the same group of Random Access Preambles as was used for the Random Access Preamble transmission attempt corresponding to the first transmission of Msg3.

If the network (gNB) receives a preamble of a CBRA corresponding to a beam configured for PDCCH (or beam having the same QCL association type (e.g. type D or A), or in other words the indicated beam is QCL'd with PDCCH beam), it understands that a beam reconfiguration is not needed and, thus, does not perform a beam reconfiguration. On the other hand, if it receives the preamble on a beam not corresponding to a beam configured for PDCCH (and not having the same QCL association type (e.g. type D or A), or in other words the indicated beam is not QCL'd with PDCCH beam), it assumes that beam reconfiguration is requested. Accordingly, gNB reconfigures the beams for the UE.

FIG. 1 shows an apparatus according to an example embodiment of the invention. The apparatus may be a terminal (e.g. UE) or an element thereof. FIG. 2 shows a method according to an example embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises first means for checking 10, means for monitoring 20, second means for checking 30, and means for instructing 40. The first means for checking 10, means for monitoring 20, second means for checking 30, and means for instructing 40 may be a first checking means, monitoring means, second checking means, and instructing means, respectively. The first means for checking 10, means for monitoring 20, second means for checking 30, and means for instructing 40 may be a first checker, monitor, second checker, and instructor, respectively. The first means for checking 10, means for monitoring 20, second means for checking 30, and means for instructing 40 may be a first checking processor, monitoring processor, second checking processor, and instructing processor, respectively.

The first means for checking 10 checks if a contention based random access is to be performed for a reason different from a beam failure recovery (S10). The means for monitoring 20 monitors if a received first reference signal has a received power above a set power threshold (S20). Alternatively or in addition, the means for monitoring 20 monitors if the received first reference signal has a received quality above a set quality threshold (S20). The second means for checking 30 checks if a reception device is configured to receive a downlink control signal (e.g. PDCCH) on a first beam corresponding to the first reference signal (S30).

S10, S20, and S30 may be performed in an arbitrary sequence. They may be performed fully or partly in parallel.

If the contention based random access is to be performed for the reason (S10=yes), the received first reference signal has the received power above the set power threshold and/or the received quality above the set quality threshold (S20=yes), and the reception device is configured to receive the downlink control signal on the first beam (S30=yes), the means for instructing 40 instructs a transmission device to transmit a preamble of the contention based random access on the first beam (S40).

Figure 3:
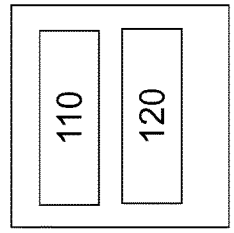
FIG. 3 shows an apparatus according to an example embodiment of the invention.

FIG. 3 shows an apparatus according to an example embodiment of the invention. The apparatus may be a network entity (e.g. a base station such as gNB or eNB) or an element thereof. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises means for monitoring 110 and means for inhibiting 120. The means for monitoring 110 and means for inhibiting 120 may be a monitoring means and inhibiting means, respectively. The means for monitoring 110 and means for inhibiting 120 may be a monitor and inhibitor, respectively. The means for monitoring 110 and means for inhibiting 120 may be a monitoring processor and inhibiting processor, respectively.

The means for monitoring 110 monitors if a preamble of a contention based random access procedure is received from a terminal in a first beam (S110). The first beam is configured for transmission of a downlink control signal (e.g. PDCCH) to the terminal.

If the preamble is received in the first beam (S110=yes), the means for inhibiting 120 inhibits a beam reconfiguration for the terminal (S120). In particular, the means for inhibiting 120 may inhibit a beam reconfiguration causing that, after the beam reconfiguration, the first beam is not configured for the transmission of the downlink control signal to the terminal.

Figure 5:
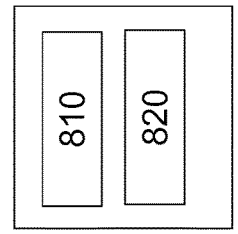
FIG. 5 shows an apparatus according to an example embodiment of the invention.

FIG. 5 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 2 and 4 and related description.

Some example embodiments of the invention are described which are based on a 3GPP network (e.g. NR). However, the invention is not limited to NR. It may be applied to any generation (3G, 4G, 5G, etc.) of 3GPP networks.

A gNB is an example of a base station. However, some example embodiments of the invention are not limited to a gNB as the base station. For example, it may be an eNB or a NodeB.

A UE is an example of a terminal. However, the terminal (UE) may be any device capable to connect to the (3GPP) radio network such as a MTC device, a IoT device etc.

Some example embodiments of the invention are not limited to the number of TCI states for PDCCH or number of CORESETs defined for release 15. These numbers may be arbitrary.

The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal (such as a UE), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a satellite acting as a base station (e.g. gNB or eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
   at least one processor; and
   at least one memory including computer program code, the at least one memory and computer program code being configured, with the at least one processor, to cause the apparatus to perform:
   determining that a contention based random access is to be performed for a reason different from a beam failure recovery;
   monitoring a received first reference signal and determining that the first received reference signal has a received power above a set power threshold and a received quality above a set quality threshold;
   determining that a reception device is configured to receive a downlink control signal on a first beam corresponding to the first reference signal; and
   instructing a transmission device to transmit a preamble of the contention based random access on the first beam based on the determinations that the contention based random access is to be performed for the reason different from a beam failure recovery, the received first reference signal has the received power above the set power threshold and the received quality above the set quality threshold, and the reception device is configured to receive the downlink control signal on the first beam,
   wherein:
   the monitoring comprises monitoring, for each of plural received reference signals, that the respective received reference signal has a received power above the set power threshold and the received quality above the set quality threshold;
   determining that a reception device is configured to receive a downlink control signal on a first beam corresponding to the first reference signal comprises determining, for each of the plural received reference signals, that the reception device is configured to receive the downlink control signal on a respective beam corresponding to the respective received reference signal;
   wherein the at least one processor and computer program code are further configured, with the at least one processor, to cause the apparatus to perform:
   selecting the first reference signal out of the plurality of reference signals each having the respective received power above the set power threshold and the received quality above the set quality threshold and each corresponding to the respective beam, wherein the reception device is configured to receive the downlink control signal on the respective beam.

2. The apparatus according to claim 1, wherein the at least one processor and computer program code are further configured, with the at least one processor, to cause the apparatus to perform:
   deciding, for each of the plural reference signals being received with the respective received power above the set threshold or the received quality above the set quality threshold and each corresponding to a respective beam being configured to receive the downlink control signal, when the respective corresponding beam is configured for communication with a network providing the downlink control signal; wherein
   the selecting comprises selecting, as the first reference signal, one of the plural reference signals being received with the respective received power above the set threshold and the received quality above the set quality threshold and each corresponding to a beam being configured to receive the downlink control signal, and wherein the beam corresponding to the first reference signal is configured for the communication with the network.

3. The apparatus according to claim 1, wherein the selecting further comprises:
   selecting a second reference signal out of the plurality of reference signals when the reception device is not configured to receive the downlink control signal on any of the plural reference signals having the respective received power above the set power threshold or the received quality above the set quality threshold, wherein the second reference signal has the received power above the set power threshold or the received quality above the set quality threshold; and
   wherein the instructing comprises instructing the transmission device to transmit the preamble of the contention based random access on a second beam corresponding to the second reference signal when the contention based random access is to be performed for the reason and the reception device is not configured to receive the downlink control signal on any of the plural reference signals having the respective received power above the set power threshold and the received quality above the set quality threshold.

4. The apparatus according to claim 3, wherein the at least one processor and computer program code are further configured, with the at least one processor, to cause the apparatus to perform:
   listening for the downlink control signal on an active beam before and after the transmitting device is instructed to transmit the preamble on the first beam, wherein the listening comprises:
   listening for the downlink control signal on the active beam before and after the transmitting device is instructed to transmit the preamble on the second beam, wherein the active beam is different from the second beam.

5. The apparatus according to claim 4, wherein the at least one processor and computer program code are further configured, with the at least one processor, to cause the apparatus to perform:
   inhibiting the instructing device to instruct the transmission device to transmit the preamble of the contention based random access on the first beam if the contention based random access is to be performed for the beam failure recovery.

6. The apparatus according to claim 5, wherein the at least one processor and computer program code are further configured, with the at least one processor, to cause the apparatus to perform:
   determining the first beam such that it is has a same quasi-collocation type as the first reference signal.

7. A method, comprising:
   determining that a contention based random access is to be performed for a reason different from a beam failure recovery;
   monitoring a received first reference signal and determining that the first received signal has a received power above a set power threshold and a received quality above a set quality threshold;
   determining that a reception device is configured to receive a downlink control signal on a first beam corresponding to the first reference signal; and
   instructing a transmission device to transmit a preamble of the contention based random access on the first beam based on the determinations that the contention based random access is to be performed for the reason different from a beam failure recovery, the received first reference signal has the received power above the set power threshold and the received quality above the set quality threshold, and the reception device is configured to receive the downlink control signal on the first beam, wherein:

the monitoring comprises monitoring, for each of plural received reference signals, if the respective received reference signal has a received power above the set power threshold or the received quality above the set quality threshold;

the determining that a reception device is configured to receive a downlink control signal on a first beam corresponding to the first reference signal comprises checkingdetermining, for each of the plural received reference signals, that the reception device is configured to receive the downlink control signal on a respective beam corresponding to the respective received reference signal; and the method further comprises selecting the first reference signal out of the plurality of reference signals each having the respective received power above the set power threshold and the received quality above the set quality threshold and each corresponding to the respective beam, wherein the reception device is configured to receive the downlink control signal on the respective beam.

8. The method according to claim 7, further comprising deciding, for each of the plural reference signals being received with the respective received power above the set threshold and the received quality above the set quality threshold and each corresponding to a respective beam being configured to receive the downlink control signal, when the respective corresponding beam is configured for communication with a network providing the downlink control signal; wherein the selecting comprises selecting, as the first reference signal, one of the plural reference signals being received with the respective received power above the set threshold and the received quality above the set quality threshold and each corresponding to a beam being configured to receive the downlink control signal, and wherein the beam corresponding to the first reference signal is configured for the communication with the network.

9. The method according to claim 8, further comprising selecting a second reference signal out of the plurality of reference signals when the reception device is not configured to receive the downlink control signal on any of the plural reference signals having the respective received power above the set power threshold and the received quality above the set quality threshold, wherein the second reference signal has the received power above the set power threshold and the received quality above the set quality threshold;

instructing the transmission device to transmit the preamble of the contention based random access on a second beam corresponding to the second reference signal when the contention based random access is to be performed for the reason and the reception device is not configured to receive the downlink control signal on any of the plural reference signals having the respective received power above the set power threshold and the received quality above the set quality threshold.

10. The method according to claim 9, further comprising listening for the downlink control signal on the active beam before and after the transmitting device is instructed to transmit the preamble on the second beam, wherein the active beam is different from the second beam.

11. The method according to claim 10, further comprising inhibiting the instructing device to instruct the transmission device to transmit the preamble of the contention based random access on the first beam if the contention based random access is to be performed for the beam failure recovery.

12. The method according to claim 11, further comprising determining the first beam such that it is has a same quasi-collocation type as the first reference signal.

* * * * *